United States Patent Office 3,306,035
Patented Feb. 28, 1967

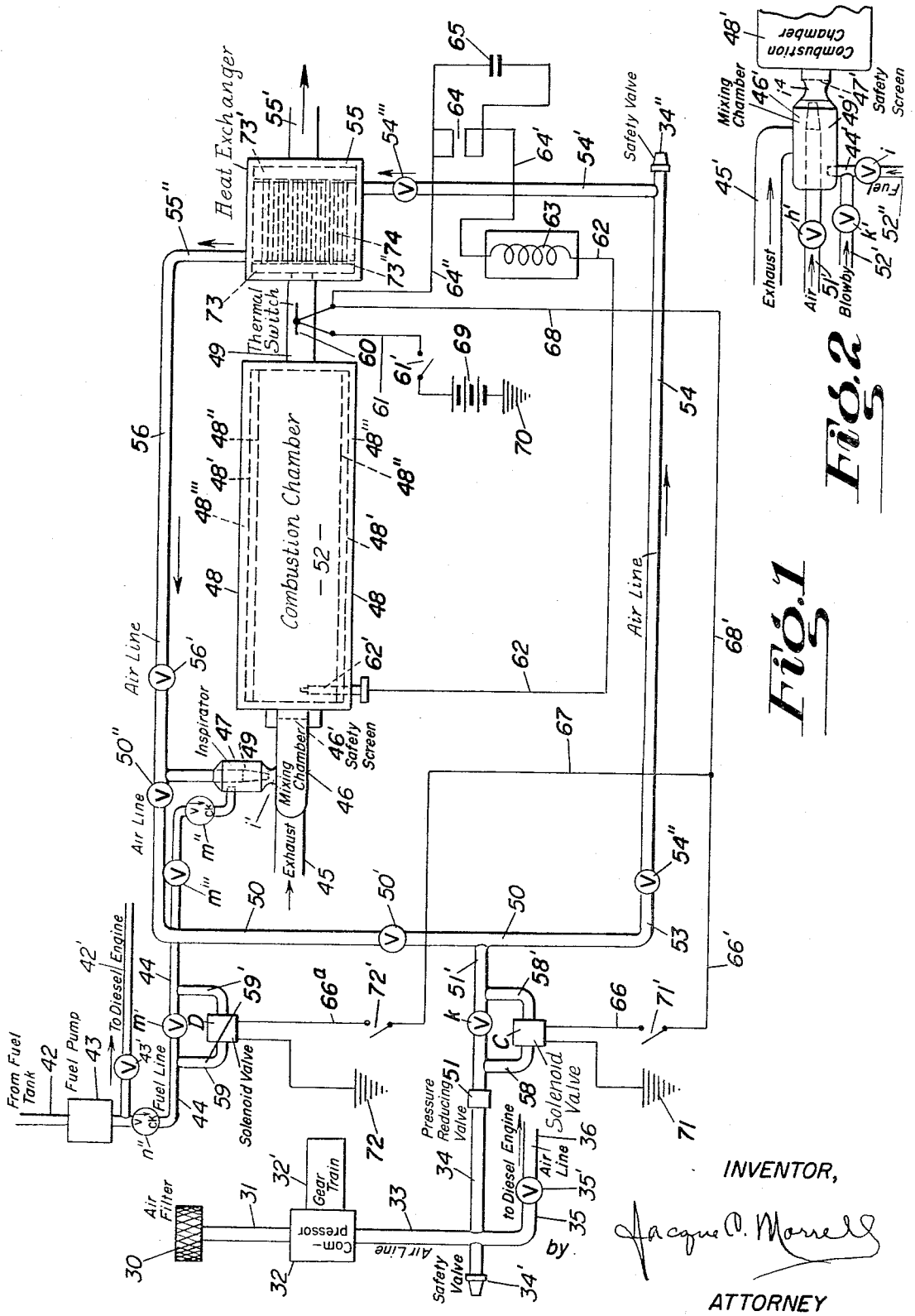

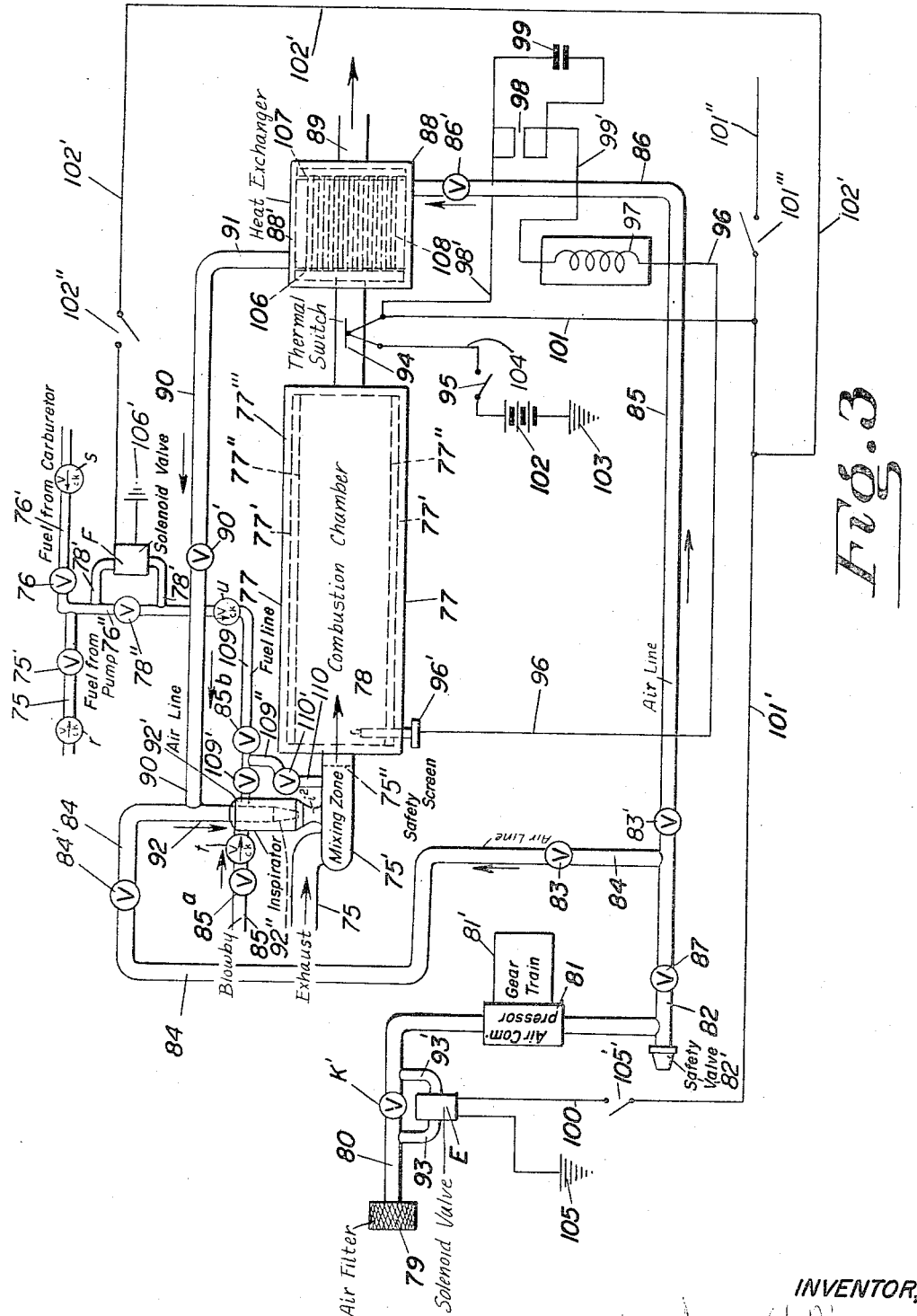

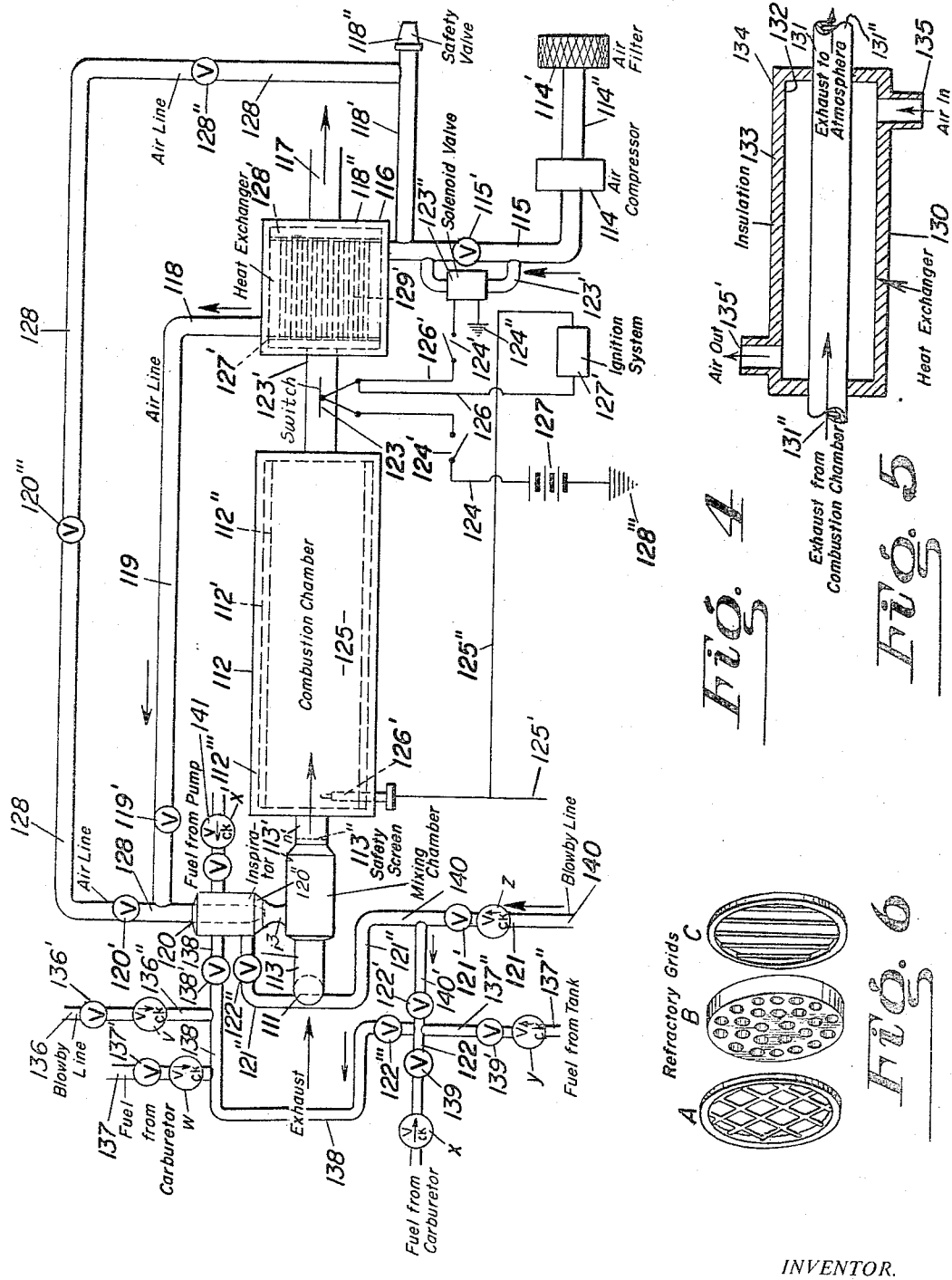

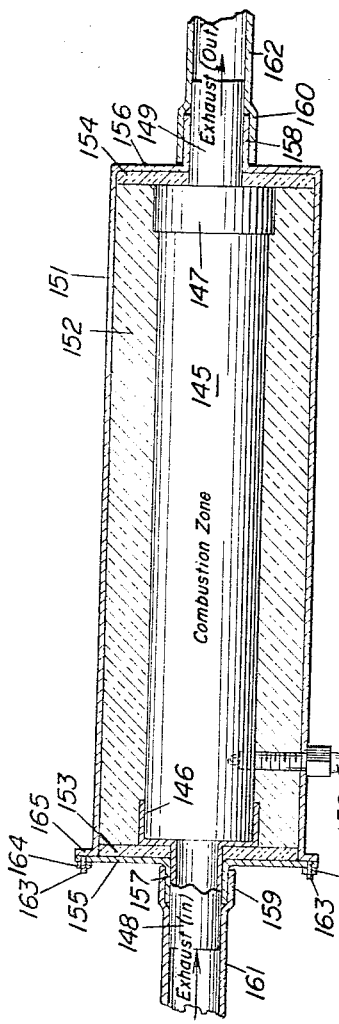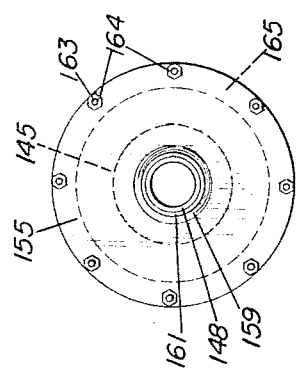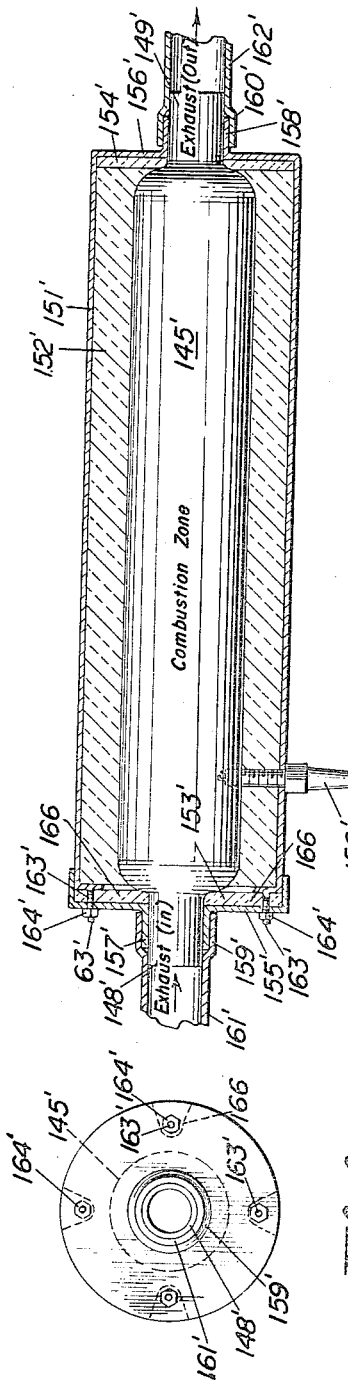

3,306,035
APPARATUS FOR TREATMENT OF EXHAUST GASES FROM INTERNAL COMBUSTION ENGINES
Jacque C. Morrell, 8 Oxford St., Chevy Chase, Md. 20015
Filed Feb. 11, 1966, Ser. No. 526,810
11 Claims. (Cl. 60—30)

This invention relates to internal combustion engines and more particularly to apparatus or means and process for removing the objectionable and toxic components of exhaust gases from internal combustion engines by conversion of the same to harmless components. This application is a continuation-in-part of my patent application Serial No. 328,397, filed Dec. 5, 1963 now Patent No. 3,248,872.

The question of air pollution especially by automobile exhaust gases has focused attention on abatement legislation on a national scale. Carbon monoxide, a highly toxic substance in which 0.1% is dangerous to life is present in exhaust gases from automobiles to the extent of 9.0% to less than 1%, depending on operating conditions; and may average about 4% taking all conditions into account such as idling, heavy traffic, starting and stopping which is the norm in city driving where the menace is greatest. Trucks, busses and taxis all add to the menace, as even more traces of carbon monoxide may be injurious and disagreeable causing headache, dizziness and the like; and in addition unburned and partially burned or oxidized hydrocarbons in the exhaust and carbonaceous materials not only are most disagreeable and malodorous but are assumed to be carcinogenic and therefore present the dangers of possible cancer. Other combustible components in the exhaust are hydrogen, and other compounds therein may include oxides of nitrogen, sulphur, and of metals principally lead.

The problem of removal or conversion of these objectionable components is a very complicated one mainly because of the many requirements, which must take into account changes in the composition and the ratio of gasoline-air mixtures from lean to rich; traffic conditions including starting and stopping and variable speeds; changes in air exhaust gas ratios; exhaust gas stream temperatures and others all of which affect the problem. In addition the economic factors of minimum size, low cost, durability under all operating conditions and other factors must be considered.

The principal approach for the solution of the problem to date has been the use of oxidation catalysts, but these have been found to be very sensitive to temperatures above about 1300° F. to about 1400° F. under which conditions they rapidly lose efficiency and deteriorate. At temperatures above 1200° F. to 1300° F. the catalysts have a short life only. On the low side the temperatures must be above 550° F. to achieve any appreciable reduction of the undesirable components and should generally be between 800° F. and 1300° F. for best results. Also during the first 30 seconds or more of operation the catalyst does not work. To overcome these problems provision must be made for preliminary heating and diversion of the exhaust gas stream when the temperature gets too high as it frequently does. These difficulties in addition to the present requirements of (a) reduction in carbon monoxide from an average of about 6% to less than 1%, (b) reduction of 2000 to 6000 parts per million of hydrocarbons to an average of 275 p.p.m. and (c) life and functioning of the catalyst for at least 12,000 miles without reactivation; have presented a problem which still remains to be solved from a practical and economic viewpoint with the use of catalysts.

I have overcome all of these problems in connection with my invention by utilizing high temperatures in the range of about 1350° F. to 2200° F. Preferably the temperatures I employ are in the range of about 1450° F. to 2000° F., in effect above and outside the temperature range of those processes which employ sensitive catalysts which deteriorate at temperatures within this range and lower.

As noted above the concentration of combustible components of exhaust gases may vary over a wide range dependent on conditions of operation of the engine, and in many conditions or in general is insufficient to maintain steady and continuous combustion. One of the special features of my invention is the addition of a fuel to the exhaust gas such as gasoline or a mixture thereof with air, e.g., of carburetor composition in general from the regular fuel supply of the spark ignition engines or in the case of diesel engines also from the regular fuel supply of the type used in connection therewith. A supply of air is added to the exhaust fuel mixture in sufficient amounts to bring about the necessary conditions of temperature and concentration for complete combustion of the combustible components in the exhaust gas that is the carbon monoxide, unburned and partially burned hydrocarbons, carbon particles and the like; as well as the added fuel to form relatively harmless carbon dioxide and water.

With regard to the added air, it has generally been found necessary to employ a forced supply of the same by the use of an auxiliary fan, pump, compressor or other suitable means in the case of spark ignition engines; and the regular compressor in connection with diesel engines. The air used in the above connection is preferably pre-heated by heat exchange with the hot exhaust gases.

Another feature of my invention is the addition to the exhaust gas or to the air, etc., added to the same, of the gasoline and air which leaks from the cylinders of the engine into the crankcase. This mixture is referred to as "blowby" and it is normally vented to the atmosphere which is of course objectionable. The use of the blowby in the manner described is not sufficient alone to maintain combustion of the exhaust under all of the varying conditions of operation of the engine, but the operation serves the double purpose of economy in assisting the added fuel for combustion of the exhaust components and getting rid of a nuisance at the same time. Similarly the gasoline vapors escaping from the vent to the atmosphere of the carburetor, which is also a nuisance like the blowby, may be collected by suitable means around the vent (not shown), and used by me in the same manner as the blowby. It is to be understood, however, that these components are actually air pollutants which would have normally escaped into the atmosphere and are not to be confused with the added primary fuel of the type and from a source supplied to the internal combustion engine. The added air must at all times be in sufficient amount to substantially completely convert all combustible components present including those in the exhaust as well as those added to carbon dioxide and water.

Combustion takes place in a suitable zone completely separate and apart from the engine operation; and a separate combustion chamber is provided for this purpose. This is an important feature of my invention since it has been found necessary to operate the engine and the vehicle for best practical results as indicated above over a wide range of conditions which inevitably results in the production of exhaust gas of varying composition with regard to combustible and concomitantly of the undesirable components. To state this question in a different manner it is applicant's objective to solve the exhaust problem without substantially interfering with the required conditions for practical operation of the engine and the vehicle.

In connection with another feature of my invention; during the operation a great amount of heat is evolved during the above said combustion and to take care of this condition I prefer to make use of a suitable heat exchanger following the combustion chamber to remove the heat from the hot combustion products leaving the chamber which at the same time heats the incoming air employed for the combustion of the exhaust gases and added fuel. This heat may also be utilized elsewhere as desired.

The heat exchange means employed may be of various type and forms; for example, the use of double walls in the combustion chamber or pipe coils around the same, but generally I prefer separate heat exchange means as described hereinafter.

In all of the above steps or combinations thereof the exhaust gas originates in an internal combustion engine of the spark ignition or diesel types which is provided with an exhaust manifold or exhaust pipe to convey the exhaust gas to the combustion chamber. A forced supply of air is mixed with the exhaust gas prior to entering the combustion chamber generally in excess of, or at least to the extent required for practically complete combustion. In the preferred modification of my invention the air is heat exchanged with the hot gases leaving the combustion chamber. The added fuel which in the case of spark ignition engines is gasoline from the fuel supply preferably after carburetion in the regular or main carburetor, or with air in a separate carburetor (i.e. of the types used in "go carts" or "chain saws") as stated is introduced for the purpose of maintaining steady combustion including the components of the exhaust gas. In addition to the added fuel the blowby or gasoline-air mixture from the crankcase is added to the mixture for combustion in the combustion chamber. The added fuel is introduced into the exhaust gas-air mixture prior to entering the combustion chamber and in general as found suitable or necessary. Alternatively all the components may be introduced into the chamber at a common point. Generally the combustible mixture may be prepared in a mixing zone prior to entry in the combustion zone wherein complete combustion may be effected. To facilitate the latter air may be introduced as found desirable or necessary at several points along the length of the combustion chamber. The air may be introduced by a compressor, blower, fan or pump through a separate line after filtering or it may, if desired, be drawn from the filtered main supply. The power required for the means of supplying the forced air supply namely compressors, pumps, blowers, fans, and the like, may be taken off the main crankshaft, e.g., thru a gear train. The source of the power is the engine itself and may be used in any convenient manner thru pulleys from the fan shaft, the main water or fuel pump, the generator, etc., as found convenient. It is desirable in the process that the exhaust gases be drawn from the manifold at maximum temperature. Some additional mixing of the combustion components will be required and take place in the combustion chamber, and in any event all of the combustion should take place and be substantially completed therein. The heat generated by the combustion may be removed in large part and utilized to preheat the incoming air by heat exchange. It is recognized that combustion may be initiated and proceed to some extent at the point of introduction of the pre-heated air and added fuel as well as the blowby gases, especially where the exhaust gases are withdrawn from the manifold at the highest temperature practicable.

The motive power required for the means of supplying air and gasoline or fuel generally which may be those supplied to the engine (i.e. from the same source) or provided especially for the combustion chamber is derived from the motive power of the engine by any suitable means such as gears, pulleys and the like. In the case of spark ignition engines separate pumps, compressors and the like may be required, whereas in the case of diesel engines the same means employed to supply the air and fuel for the engine may likewise be used to supply the combustion chamber.

Another desirable feature in connection with my invention, while not necessary for the operation thereof, gives substantially improved results is the use of heat resistant refractory filling materials or lining and the like for the combustion chamber. Basically the simple ceramic and other high temperature refractories may be employed such as fireclays, fireclay brick, silica, magnesite, high alumina, chrome and zircon refractories, silicon carbides, sillimanite, mullite, refractory porcelain shapes and others, but that it is contemplated employing also the simple refractories which may be coated and/or impregnated if desired with refractory oxides and metals or compounds which may be effective to some degree as high temperature heat resistant catalysts; the overriding requirement being that they are resistant to temperatures of the order referred to above. I may also use rugged oxides as such or as surfacing agents of aluminum, magnesium, titanium, zirconium, beryllium and the rare earths such as thoria, ceria and the like in a great variety of shapes.

I may also employ the noble metals such as platinum, palladium, rhodium and the like as surfacing agents to promote combustion. The refractories are preferably of suitable sizes and a great variety of shapes (e.g. short hollow cylinders, saddles and the like) so that when placed in the combustion chamber the interstices permit passage of the exhaust gases (and added air and fuel) to promote combustion of all combustible components without undue back pressure. Also high temperature alloys may be employed in combination with or instead of the refractories mentioned. In this connection it is emphasized that refractory surfaces, even if they consist only of the chamber lining, and/or grids or checker work greatly assist combustion. Also in any case the chamber must be made of heat resistant or refractory materials. However, such refractories should not impede the flow of gases or induce undesirable back pressures.

The refractory surfaces transmit heat from the burning mixture of gases once initiated and increase both the rate of ignition and of combustion and/or oxidation even to the extent of inducing surface and in some cases flameless combustion. The influence of the heat refractories is so pronounced that its effect has been designated as surface combustion. In the presence of silica, fireclay and various oxide materials mentioned herein combustion chain reactions may be catalyzed even at lower temperatures than those mentioned. Also heat transfer temperature effects coupled with local turbulence caused by surface roughness of a bed, for example of broken refractory materials (which I also contemplate using) or of irregularly disposed refractory shapes and forms are of major importance in surface combustion at high furnace temperature. I may also employ grids functioning like checker work in a recuperative furnace and this, of course, is also made of refractory material. High temperature alloys may also be used in this connection although not equivalently.

Referring to the accompanying drawings showing FIGURES 1 to 10: FIG. 1 is a flow diagram partly in side elevation and in cross section which has reference to my invention for the treatment of exhaust gases from internal combustion engines and associated vehicles and especially from engines of the diesel type utilizing the regular air compressor and fuel pump of the latter in connection with the supply of these materials to the combustion chamber. FIG. 2 is a detail of an alternate form of the feed system for these combustible materials showing how the forced air supply may be used to induce flow of the exhaust by inspiration and dispersion of the added fuel; as well as certain safety features. It is noted that this arrangement is applicable not only to the form of my invention shown in FIG. 1 for diesel exhausts but also to the other forms of my invention shown in succeeding figures applicable to the treatment of exhausts from spark ignition types of engines. FIG. 3 is a flow diagram partly in side elevation and in cross section relating particularly to treatment of exhausts from the spark ignition type of internal combustion engines and related vehicles. FIG. 4 is a similar view of apparatus and process illustrating a form of my invention like FIG. 3 but is considered a simpler and somewhat more practical version of the same as applied to a spark ignition type of internal combustion engine used in connection with an automotive vehicle. FIG. 5 shows a highly simplified heat exchanger which may be used in connection with the versions of my invention referred to in the foregoing figures. FIG. 6 shows various forms A, B and C of refractory grids or flame targets which may be used within the combustion chamber to assist combustion. FIG. 7 shows the details of one type of combustion chamber (referred to as combustion zone) which may be employed by me, and FIG. 9 shows an alternative type of combustion chamber which may also be used in connection with my invention. FIGURES 8 and 10 show combustion chamber closures which may be employed with FIGURES 7 and 9 respectively.

FIGURE 1 as noted relates specifically to diesel engines wherein the air is compressed, e.g., to a much higher order of pressure than the spark ignition type of engine which heats the air to a high temperature, and the fuel, normally heavier than gasoline, is sprayed or injected into the air thus heated to form the explosive mixture.

Referring now to FIG. 1 and particularly to the flow of materials and reactants, namely the exhaust, air, added fuel, etc., and various means employed in connection with my invention used in connection with internal combustion engines which is the source of the exhaust gases leaving the exhaust manifold system thru the connecting section of the exhaust conduit 45 and passes into the combustion zone or chamber 48, preferably after passing thru the premixing zone designated as mixing chamber 46. The combustion chamber may be lined with a ceramic or other heat refractory material 48" and in general may be made of heat resisting alloy steel (the external walls being illustrated as 48"') to minimize deterioration of the same. Pre-mixer or mixing chamber 46 may be similarly made of or provided with heat resisting material and may, if desired, be lined with a ceramic lining. The combustion chamber 48, as well as the heat exchanger 73 connected therewith, may be insulated for heat control and fuel economy. (If desired, a portion of the exhaust gases entering the chamber may be further heated (not shown) in the heat exchanger with the air.) Also it may be noted that while the combustion chamber and heat exchanger may serve at least in part as a muffler some conventional form of the latter as required or of a resonator (not shown) may be employed in conjunction with the combustion chamber and heat exchanger.

The combustion chamber may, if desired, contain refractory filling materials, grids and the like of the type referred to above to assist combustion and while not entirely necessary for the operation of my process these refractory materials do give improved results in promoting combustion and mixing of the gases within the chamber as well as helping to maintain uniform temperature conditions by heat retention.

Simultaneously with the passage of the exhaust gases thru mixing zone 46, and the combustion chamber 48; air is introduced into the exhaust gases using appropriate means such as a compressor or blower (generally in the case of diesels utilizing the regular compressor) to provide a forced and adequate supply to complete combustion of all combustible materials entering the chamber.

The air is drawn thru air filter 30 and line 31 by compressor 32 operated by gear train 32' which is motivated by the regular engine mechanism. The air passes thru air line 33 and may comprise the regular supply of air to the diesel engine passing thru line 35 controlled by valve 35' and thru line 36. The supply of air employed for the combustion of the combustible exhaust gas components and added fuel is passed thru line 34 and is normally controlled by valve K, which may be set as required for normal operation, with appropriate check or pressure reducing valve 51 set as desired. However, in order to vary the supply of air to take care of the varying conditions and requirements in the combustion chamber 48, additional air may be supplied thru lines 58 and 58' controlled by the solenoid valve C which as described later is actuated by an electric current in response to and coordinated with combustion chamber air requirements. Safety valve 34' is set to release excess pressure on the system. The air passes thru line 51' into line 50 from which it may pass to the heat exchanger to be heated by the hot gases leaving the combustion chamber thru line 53 controlled by valve 54" and thru line 54' controlled by valve 54"' into the heat exchanger where it is heated by indirect heat exchange as described and then passes thru line 56 and into and thru the inspirator 47 and the orifice $i'$ of the latter to mixing chamber 46 to be mixed as described with the exhaust gases from the manifold passing thru exhaust line 45. Alternatively all or a portion of the air passing into line 50 may (depending on the setting of valves 54" and 50' and 50") be likewise passed into and thru the inspirator 47 and nozzle 49 into the mixing chamber 46.

Simultaneously with the introduction of air and exhaust gases into the combustion chamber a supply of fuel preferably that from the same source as used by the engine which, in the present case the diesel engine, is drawn from the fuel tank (not shown) thru line 42 by means of fuel pump 43. This fuel may generally be that required for the normal fuel feed to the engine which as stated is diesel fuel, heavier than gasoline and is initially atomized with the air rather than being vaporized as is the case with gasoline. If desired small amounts of the latter may be introduced from an auxiliary source into the diesel fuel, air, exhaust mixture to facilitate ignition in the chamber. The diesel fuel passes line 42' controlled by valve 43' to supply the engine. A portion of the fuel oil passes thru line 44 normally controlled by valve M' set for normal operation of the minimum fuel requirement for the combustion chamber, in addition to the combustible components of the exhaust gas. As more fuel is required to maintain proper temperature conditions in the combustion chamber for steady and substantially complete combustion this may be supplied thru the solenoid valve D thru lines 59 and 59', line 44, valve M"' and into inspirator 49. Check valves $n''$ and $m''$ control the direction of flow of the fuel and serve to some extent as safety devices. The inspirator 47 assists in dispersing the liquid fuel which is forced from the fuel pump by the action of the relatively high velocity flow of the air using the venturi principle thru nozzle 49 which is an element of the inspirator. The mixture of air and atomized fuel enter the mixing chamber together with the exhaust gas and the combustible mixture is fed into the combustion chamber or zone 52 where combustion of all of the combustible components occurs. During this operation air may be fed or introduced at various points of the combustion chamber to assist in completing combustion. The combustion chamber preferably is made of a heat resistant alloy steel, the inner wall of which is designated as 48', and is also preferably lined with a refractory ceramic type of material 48" as well as being insulated e.g. at 48"' to control excess and undue heat emanating therefrom. This insulation may consist of glass wool or rock or slag wool, or asbestos or other suitable insulation illustrated at 48"' and may be in compact form to conform to the shape of the combustion chamber held in place by metal bands or straps or preferably contained in the thin metal shell illustrated at 48. It is noted that where the refractory ceramic lining may not be employed 48' and 48" may represent the outer and inner walls or surfaces of the combustion hamber made of a highly heat resistant refractory alloy teel or metal generally.

Ignition of the combustible mixture leaving the mixing chamber or zone 46 and entering the combustion chamber is accomplished by means of the spark plug 62' which in the case of the diesel type of engine is especially provided for this purpose, including the battery, ignition coil, etc., as described below. The highly heated gases, including all the products of combustion, leave the combustion chamber through outlet conduit 49 and pass thru the heat exchanger 73 entering at 73" and thru the tubes 74 and leaving thru 73' and conduit 55' thru a conventional muffler and/or resonator and ultimately thru the tail pipe to the atmosphere at which stage it is substantially free from the objectionable components of the exhaust gases. The heat exchanger may be insulated (not shown), similarly to the combustion chamber as described. The air entering the heat exchanger passes around the tubes 74 wherein heat exchange takes place with the hot gases passing therethrough and to the mixing chamber as described.

Thermal switch 60 sensitive to changes in temperature is located in outlet conduit 49 of the combustion chamber 48, and controls the spark plug 62 and the solenoid valves C and D which control the flow of air and fuel respectively to the mixing chamber and the combustion chamber when the temperature drops therein (as indicated by the thermal switch) as a result of the imbalance of the combustible materials in the exhaust gases and otherwise. It is noted in this regard that at the beginning of the operation the temperature is below that required for steady operation so that the spark plug is energized for intermittent spark on closing the manual switch until the temperature rises above about 1400° F. to 1450° F. The spark plug, which is grounded, is connected thru line 62 and controlled thru a conventional system of ignition coil 63 and interrupter 64 and condenser 65, which in turn is connected thru line 64". The arrangement of this electrical control system is generally more or less conventional and variations of this and other control systems may be employed. The solenoid valves C and D are controlled respectively thru lines 66' and 66 on the one hand and lines 67 and 66ª on the other, both connected by line 68'. The source of power for all of these electrical components is the storage battery 69 grounded at 70. In addition to thermal switch 60 there is a principal manual switch 61' for control which may be located on the panel. The battery, spark plug and solenoid valves C and D are grounded, the latter as shown at 71 and 72 respectively. Manual switches 71' and 72' may be used to cut out either or both of the solenoid valves as desired.

Both of the valves are energized as stated by thermal switch 60 when the temperature drops below about 1450° F. Line 61 is included to illustrate where electrical circuits may be positioned for other uses as found necessary. As additional features of control a safety screen 46' (on the general principle of Davy Safety Lamp or device serving the same purpose) may be placed at the exit of the mixing chamber to check backfire. Also control instruments (not shown) like a pyrometer for the combustion chamber and a temperature indicator which may be located on the panel may be used as desired.

FIGURE 2 as previously stated shows a detail of an alternate form of the feed system of the combustible mixture entering the combustion chamber and since this form may be used in connection with FIGURES 3 and 4 as well as with FIG. 1, it will be described later.

Referring to FIG. 3 which applies particularly to the treatment of exhaust gases from the conventional internal combustion engine with spark ignition and otherwise is similar in many respects to principles of FIG. 1: Air is drawn preferably thru the filter 79 (or alternatively if desired thru the regular air filter on the engine) into line 80 by means of air blower or compressor 81 (or other suitable means for a forced air supply). The compressor is shown in the present area as being operated by gear train 81 powered by the engine but may operate by pulley off of the fan shaft or other convenient means and source of power from the engine.

The air passes thru line 80 and normally may be controlled by valve K' manually set to meet normal requirements. However in order to vary the supply of air to take care of changing conditions and requirements in the combustion chamber additional air may be supplied thru lines 93 and 93' controlled by solenoid valve E which as described later is actuated by an electric current in response to and coordinated with the requirements in the combustion chamber 77. Safety valve 82' relieves excess air pressure in the system. The air after passing into line 82 controlled by valve 87 may be passed thru one or more of several paths as later described to be mixed with exhaust from the manifold and added fuel and introduced into the combustion chamber 77 so that the combustible components in the mixture may be substantially burned to harmless products as hereinbefore referred to.

On a generalized basis the exhaust gases as in FIG. 1 leave the manifold system thru connecting section of exhaust conduit 75 and are mixed with air and with added fuel in mixing zone 75' and from there the combustible mixture is introduced into combustion chamber 77. The nature of the added fuel in the present case, however, is quite different than in FIG. 1. The combustion chamber as in FIG. 1 preferably may be lined with a ceramic or other heat refractory material 77" and in general it may be made of heat resisting alloy steel; which if desired will allow the inner surface to be exposed, to prevent deterioration of the same. (The chamber wall is indicated at 77'.) The mixing chamber may also be made of similar material. The combustion chamber may also be insulated, shown at 77''' as in FIG. 1, and for the same reason similarly the heat exchanger 88 may be insulated, shown at 81'. Also it may be noted that while the combustion chamber and the heat exchanger may serve at least in part as a muffler, some form of the latter, or a resonator (not shown), may be required following the exit of the gases from the same.

The combustion chamber may, if desired, contain refractory material referred to above to promote combustion and assist in mixing the gases undergoing combustion as well as in maintaining uniform temperature conditions by heat retention.

Reverting to the flow of the forced air supply passing thru line 82 and control valves 87 and 83' and thru lines 85 and 86 controlled by valve 86' the air passes thru the heat exchanger 88 over the tubes 108 thru which the hot gases from the combustion chamber pass over heating tubes 108 in indirect heat exchange with the incoming air heating the latter and cooling the hot gases. The preheated air may also be introduced into the chamber at various points along its length to assist in the combustion process. The heated air leaves the heat exchanger 88 thru lines 91 and 92 into the inspirator 92', and thru the latter into the mixing chamber to be mixed with exhaust gas and added fuel. Alternatively a portion of the air supply may pass without pre-heating thru line 84, by adjusting valves 83' and 83 and pass thru line 84 controlled by valve 84' and pass directly to the inspirator thru line 92 and from there to the mixing zone, where it is mixed with the exhaust gases and added fuel. This procedure permits control of the temperature of the air entering the mixing zone.

With regard to the fuel added to the mixture of air and exhaust gases (or simultaneously with the mixing of the latter) to permit control of the combustion of the combustible components in the exhaust gases this may comprise (a) the blowby or gasoline air mixture originating in the crankcase, (b) gasoline-air mixture from the carburetor or intake manifold which normally is passed to and utilized in the cylinders of the automotive engine and (c) gasoline itself from the tank or other source preferably of the type utilized by the engine itself and alternatively the last named fuel from a special carburetor (not shown) e.g. of the diaphragm type used in go carts, gasoline powered saws and the like. The proportions of fuel or combustibles generally to air added should be kept within the limits of inflammability to achieve substantially complete combustion in a practical manner. While some control of the added fuel may be obtained by the use of manual control such as throttle, valves and the like, I prefer the use of the special means described below.

The blowby gases as the name indicates are those escaping unburned from the cylinders of the engine on the upstroke of the pistons into the crankcase and normally through the draft or vent tube of the latter into the atmosphere. It is estimated that they may account for up to 40% of the hydrocarbons escaping from the system and exhausted into the atmosphere including those in the exhaust gas itself; and constitute a nuisance along with the unburned and partially burned hydrocarbons, the carbon monoxide and hydrogen and the finally divided carbonaceous substances in the exhaust gases. They are, however, insufficient in quantity to maintain combustion of the undesirable components of the exhaust gases under the varied conditions of operation which makes it necessary to add the other fuel referred to, to maintain both the desired concentration of combustible and temperature range for satisfactory combustion and conversion of the undesirable components in the exhaust gases.

Thus in addition to getting rid of the nuisance of the blowby gases as such (in composition approximately in the normal mixture of unburned gasoline vapors and air) they may be used as fuel in addition to other fuel to augment the combustible substances in the exhaust gases referred to above (carbon monoxide, hydrogen, unburned and partially burned hydrocarbons, carbonaceous materials and the like), especially where the latter are in too small proportions, due to variable operating conditions to support the desired combustion in the combustion chamber and/or to remove and/or convert all of the undesirable components from the exhaust gases.

The blowby is generally withdrawn from the crankcase, for example, thru the vent or draft tube of the same and may be passed thru line 85 controlled by valve 85ª and check valve T (to prevent back flow) and is drawn into the inspirator by induction as a result of the flow of air thru the nozzle 92″ of the inspirator and mixes with the air in the mixing zone 75′. Simultaneously fuel from the carburetor (consisting of a mixture of gasoline and air) indicated at 76′ controlled by valve 76 and check valve S passes thru line 76″ controlled by valve 78″′, and thru check valve U into fuel line 109 controlled by valves 85b and 109′ and may pass into the inspirator 92′ drawn in by the force of the air passing thru the inspirator nozzle 92″ and orifice $i^2$ as in the case of the blowby described above. The mixture of air, gasoline vapors, and blowby then pass into the mixing zone 75′ and from there into the combustion chamber 77. Valve 78″ may be manually set to control the normal supply of added fuel from the carburetor. However in order to meet increased requirements when the temperature in the combustion chamber drops below about 1400° F. to 1450° F. additional fuel from the carburetor or intake manifold may be supplied thru the bypass 78′ controlled by solenoid valve F electrically actuated as hereinbefore described in connection with FIG. 1, as well as in greater detail below. This additional fuel then passes as described into line 109 etc. to the mixing chamber. Alternatively, fuel from the regular gasoline pump or tank of the engine (or from some other special source) (either as a liquid or carbureted with air in a special carburetor) may be passed thru line 75 with check valve $r$ and valve 75′ control may be simultaneously pumped and/or drawn into the inspirator thru line 75″ controlled by valve 78″ controlled as already described. Increased requirements may be obtained thru solenoid valve F as described above and passes into the inspirator thru line 109 and further as described.

In the case of the liquid fuel it is not only drawn in but is also atomized or dispersed in the air in the inspirator by the force of the air passing thru nozzle 92″ according to the venturi and/or inspirator principle and passes in this form to be mixed with the exhaust gases and air in the mixing zone 75 and from there to the combustion chamber, as in FIG. 1. The liquid fuel, in this case gasoline, under the force of the pump may if desired be bypassed from line 109 to lines 109″ and 110 controlled by valve 110′ and passed into the moving hot stream of gases in the mixing chamber where it is vaporized. The mixture then passes to the combustion chamber.

The combustible components in the exhaust, fuel air mixture entering the combustion chamber or zone 78 are ignited by the spark plug 96′ which together with the solenoid valves is actuated by an electrical circuit preferably operating off the regular battery system (or by special battery as required). At the beginning of the operation the temperature in the chamber is below that required for steady operation so that the spark plug is energized for intermittent spark on closing the manual switch until the temperature rises above about 1400° F. to 1450° F. The spark plug which is grounded is connected thru line 96 and controlled thru a conventional system of ignition coil 97 and interrupter 98 connected by line 99′ and condenser 99. The arrangement of this electrical control system is more or less conventional and variations of this and other control systems may be employed. The solenoid valves E and F are controlled respectively thru lines 101′ and 100; on the one hand and 102′ on the other, both connected to line 101 which in turn connects to thermal switch 94. The source of power for all of these electrical components is the storage battery 102 (which may be the regular battery) of the engine and vehicle generally, which is also connected to the thermal switch thru line 104. In addition to the thermal switch 94 there is a principal manual switch 95 for cut off control which may be located on the panel. The battery, spark plug and solenoid valves E and F are grounded, the former at 103 and the latter at 105 and 106′ respectively. Manual switches 105′ and 102″ may be used to cut out either or both of the solenoid valves as desired. Manual switch 101″′ and line 101″ lead to other electrical components of the engine and vehicle generally as desired.

Regarding the function of the thermal switch, combustible mixture as stated leaves the mixing chamber or zone 75′ and enters the combustion chamber or zone where it is ignited by the spark plug and combustion is completed in the chamber. The hot gases leaving the combustion chamber pass thru the connecting conduit 94 in which is placed the thermal switch which is sensitive and responsive to temperature changes in the combustion chamber and which actuates the spark plug and the solenoid valves as desired, when the temperature in the chamber falls below about 1400° F. to 1450° F. Various devices may be employed for observation or control, e.g., a pyrometer in the chamber attached to meter which may be on the panel (both not shown) for temperature observation and a safety screen 75″ on the Davy safety lamp principle to avoid flashback and others as found necessary. The hot gases then pass thru the heat exchanger which functions as described and thru line 89 the muffler and/or resonator (if used or found necessary to the tail pipe and the atmosphere). The exhaust gases at this stage are substantially free (to the extent found acceptable) from the objectionable components originally therein.

FIG. 4 is a simplified and somewhat more economical practical version of FIG. 3 (containing many features in common) for the treatment of exhausts particularly adapted to the spark ignition type of automotive engine or internal combustion engines generally. Air is drawn thru the filter 114′ and line 114″ as a forced air supply by means of a compressor, blower fan or other suitable means of forced air supply shown at 114. These may be operated by a gear train attached to the main shaft of the engine, or may be otherwise suitably powered by means of a pulley or gear off other shafts, e.g., the principal fan and others as found convenient or desirable to obtain a forced supply of air. The air passes thru line 115 and is normally controlled by manual control valve 115′. However to meet the needs of changing conditions and of increased supply of air for steady combustion additional air may be supplied thru bypass 123′ by means of the solenoid valve 123″ electrically actuated, as later described, in response to changing temperatures in the combustion chamber as described in connection with FIG. 3 and to be described in greater detail below. Safety valve 118″ acts to avoid excess pressure.

The air passes over heating tubes 129′ in heat exchanger 116 where it receives heat by indirect heat exchange with the hot gases passing thru the heating tubes. The hot gases are in turn cooled. The heated air leaves the heat exchanger thru line 119 controlled by valve 119′ and enters line 128 passing into inspirator 120 and thru the nozzle of the inspirator 120″ and orifice $i^3$ into the mixing chamber 113′ where the heated air mixes with the exhaust gas from the exit manifold of the engine passing thru the connecting conduit 113. The flow of air thru the inspirator 120 induces the flow of added fuel introduced therein as later described. Simultaneously with the flow of air thru the inspirator, crankcase fuel or blowby (the type, source and origin of which has been fully described in connection with FIG. 3) is fed as in FIG. 3 thru line 136 controlled by valve 136 and check valve V is passed into line 136″ and thru line 138 controlled by valve 138′ into inspirator 120, and from there into the mixing chamber 113′ and to the combustion chamber to utilize it as a fuel and to get rid of it as a nuisance. It is especially noted that the forced flow of air thru the nozzle of the inspirator induces a flow of the crankcase fuel-air mixture or blowby, or other secondary pollutant fuel described above. Also the setting of the valves are such that pratically all of the blowby produced by the engine is treated as described. Alternatively blowby from the same source as already described may be fed into the inspirator and in sequence the mixing chamber and the combustion chamber thru line 140, check valve Z, control valve 121′ and thru line 121″ controlled by valve 122″ into the inspirator. This path represents an independent flow of the blowby into the inspirator or it may be crossed over thru line 140′ controlled by valve 122′ to be combined either with fuel from the carburetor or from the tank or pump. Simultaneously added fuel from the carburetor or intake manifold as in FIG. 3 may be fed thru line 139″, controlled by valve 139 and check valve X, and thru valve 122‴ line 138 controlled by valve 138′ into the inspirator, or alternatively thru line 137 controlled by valve 137′ and check valve W into line 138 controlled by valve 138′ into the inspirator, which operates in both cases to induce flow of the carburetor fuel with the forced air supply into mixing chamber where the fuel and air are mixed with the incoming exhaust gas. Simultaneously or alternatively, fuel from the tank or pump preferably supplying the engine with its fuel supply may be fed into line 137″ controlled by valve 139′ and check valve Y into line 138 controlled by valve 138′ into the inspirator. This fuel in liquid form is both pumped and drawn in by the inspirator by induction and is atomized by the force of the air flowing thru the nozzle of the inspirator 120″ and may enter the mixing chamber 113′ partly as a dispersion atomized in the air and partly vaporized, but in any event as gasoline may be wholly vaporized in the mixing chamber. It may be noted that the alternative flows of the blowby permit it to be fed in continuously and independently of the other fuels thru line 140 etc.; also the fuel designated as from the carburetor may be in one case from the carburetor which supplies fuel to the engine, e.g., that entering line 137 while that entering line 122 may be liquid fuel carbureted in a special carburetor as referred to in FIG. 3. All of the latter are primary fuels. These alternative flows are intended to illustrate the flexibility of the system and of course other combinations of fuel flow may be devised and are contemplated within the scope of my invention.

In all cases the mixture of exhaust gas, air, and added fuel as well as the blowby flow from the mixing chamber or zone into the combustion chamber 112 or more specifically into combustion zone thereof designed as 125 wherein practically complete combustion and substantial conversion of all combustible components of the exhaust gas as well as the added fuel and blowby is accomplished. A safety screen 113″ located in the neck $n'$ of the mixing chamber performs the function already noted above.

As in FIG. 1 and FIG. 3 the chamber may be lined with ceramic or refractory materials shown at 112″ and may be insulated shown at 112‴ and may be enclosed by a metal shell located at 112. Also the chamber may be made of heat resistant alloy steel to prevent deterioration (whether or not a ceramic lining is employed) as indicated at 112′ and the mixing chamber may also be made of high temperature resistant alloy steel and may also be insulated and/or lined as found desirable. The heat exchanger may also be insulated as described in connection with FIGURES 1 and 3.

The hot gases leaving the combustion chamber pass thru conduit 123′ in which is located a thermal switch sensitive to and responsive to temperature conditions in the combustion chamber. This thermal switch as will be described below actuates the spark plug 126′ to ignite the combustible mixture and the solenoid valve 123″ to control the flow of air, and consequently thru the principle and basis of operation of the inspirator controls the flow of fuel. Both the spark plug and the solenoid are energized when the temperature in the combustion chamber falls below about 1400° F. to 1450° F. The combustible components in the gases entering the combustion chamber from the mixing chamber are ignited by the spark plug which is actuated by an electrical circuit, preferably operating off the regular battery system. At the beginning of the operation the temperature of the chamber is below that required for steady operation so that the spark plug is energized for intermittent spark on closing the manual switch until the temperature rises above about 1400° F. to 1450° F. The spark plug which is grounded is connected thru line 125″ to the ignition system designated as 127′ (which in general is of a conventional type, e.g., as described in connection with FIG. 3) and by line 126 to the thermal switch. The solenoid valve for air control is controlled thru line 126 and may be disconnected thru switch 124′. It is shown grounded at 124″. The source of power for both the spark plug and the solenoid valve may be the regular storage battery 127 of the engine and vehicle system generally, and it is connected to the thermal switch thru line 124. In addition to the thermal switch 123 there is a manual switch 124 for cut off and control which may be located on the panel. The battery is shown grounded at 128‴. To complete the cycle the hot gaseous products leaving the combustion chamber pass into zone 127′ of the heat exchanger, thru heating tubes 129′ and out zone 128′ and thru the exit line 117. The combustion chamber and heat exchanger may function to some extent as a muffler and resonator but they may be used to the extent required and the coverted gases passed thru the same. Finally the gaseous combustion products generally from which objectionable substances have substantially been removed are passed thru the tail pipe and vented into the atmosphere.

Reverting to the use of the inspirator in the control of fuel addition to the air/exhaust mixture as a feature of my invention as illustrated especially in FIG. 4 (as well as in FIGURES 1 and 3) which includes control of the added primary fuel as well as the secondary pollutant types such as blowby etc.; and more particularly the use of the inspirator for this purpose in conjunction with and coordinated with the use of a forced supply of air the following is noted: In the inspirator tube as illustrated in the figures the velocity of the flowing gas increases greatly from the entrance or wide end thru the narrow or constricted throat or orifice. This is particularly important as the forced air supply itself is flowing at a relatively high but controlled velocity thru the nozzle into the inspirator tube and draws the fuel in and with it. The rate of air flow may be controlled by the valves and is directly coordinated with the flow of fuel and in effect the energy imparted to the flowing air may in turn be transferred to the fuel in the desired manner, i.e., increase of air flow results in increased fuel flow. The valves for blowby control are set to draw it into the mixing chamber and prevent it from contaminating the atmosphere without disturbing the function of the crankcase (or carburetor) ventilation normally to the atmosphere. The rate at which the primary fuels are drawn in is also balanced between the need to maintain proper combustion temperature in the combustion chamber (and proper functioning of the normal engine operation) as well as a proper balance between fuel and air.

The expression "forced air supply" generally refers to a supply of air originating from a compressor, blower, pump, fan and other similar means with moveable or moving parts or elements which impart to the air (by compression or otherwise) a substantial force and an increased supply of air per unit time when compared to an induced flow, e.g., by the natural flow of the exhaust gases which is insufficient for the purpose. This provides an ample and controlled supply of air and permits the use of the inspirator, a simple and low cost device in combination with the forced supply of air to be used in a practical manner to accomplish the purpose instead of more expensive and complicated equipment.

FIGURE 2, which is applicable to all of the variations of my invention, illustrates further how the energy of the forced air supply may be employed in combination with the inspirator principle to energize the flow of the exhaust as well as the fuels added thereto without interfering with the operation of the engine. Referring to FIG. 2, the exhaust from the manifold passes thru conduit 45′ into the mixing chamber 46′. Simultaneously the forced air supply passes thru line 51′ controlled by valve $h'$ and thru nozzle 49′ at high velocity. The air stream passes thru the orifice contracted at $i^4$. The normal flow rate of the exhaust is increased by the inspirator, i.e., it is energized and drawn in to the mixing chamber which functions as the wider element of the inspirator by the inspirator action of the air stream flowing thru the contracted orifice element and the air and exhaust are thus mixed. Simultaneously secondary fuel such as blowby or crankcase gasoline is drawn into the mixing chamber controlled by valve $k'$ and primary fuel is drawn in from the carburetor and/or the fuel pump or tank (heretofore described) thru line 52″ controlled by valve $i$. The mixture of exhaust, combustibles, and air are then fed into the combustion chamber. The system illustrated by FIG. 2 may alternatively be applied to FIGURES 1, 3 and 4.

The use of check valves as shown in the drawings in FIGURES 1, 3 and 4 and flow of materials, while desirable in some instances are not entirely necessary in many cases where they are shown. However they emphasize the desirability of one direction flow or preventing reverse flow which in some cases are especially a desirable safety measure to prevent undesirable back flow. Their use is of course optional as required.

The safety screens or flame arresters shown in the drawings of FIGURES 1, 3 and 4 in the conduit from the mixing chamber to the combustion chamber likewise illustrates safety measures and are quite desirable to prevent backfire or flash back or retrograde from the combustion chamber. The drawings show single screens or units but a plurality of these screens may be employed at the extreme downstream portion of the mixing region or mixing chamber. These safety screens or flame arresters illustrate a well known principle. The flame arresters may comprise a standard high temperature resistant wire mesh or screen of the steel wire gauze-type material or the like. They may be fitted into suitable frames and may be optionally used fixedly secured transverse to the path of flow of the combustible gases or mixture containing the same before leaving the mixing chamber and entering the combustion chamber. It is noted also that such flame arresters function to prevent premature ignition of an overly rich mixture which might collect. Alternative types of flame arresters may also be employed.

It is also to be noted generally that while I have illustrated and prefer the use of an electrically activated type of solenoid valve to regulate the flow of supplementary fuel and air supply, other means are available. It is recalled in this connection the manually controlled valves of various and suitable conventional types (including in special cases throttle valves) may be set for normal requirements. Where conditions require additional fuel or air responsive to temperature drops in the combustion chamber as described above the use of an automatic valve of the solenoid type has been described as suitable for this purpose in which case the manually controlled valve is set to admit a predetermined supply of gasoline and air mixture (in addition to the blowby, etc.). As an alternate to the solenoid valve certain mechanical or automatic types of valves generally responsive to temperature changes in the combustion chamber operated in conjunction with the thermal switch or bimetallic elements may also be employed either alone or in combination with the solenoid. Generally these mechanical devices are coordinated with the manifold vacuum line of the engine utilizing diaphragm or bellows devices and other conventional means in connection therewith. These are generally conventional devices and may if desired be employed by me to accomplish the intended purpose. Also the ignition devices and specific electrical circuits illustrated are conventional and may be varied as desired.

It may be noted that the temperature within the combustion chamber may go even above the desired upper limit of about 2200° F. referred to above and in general the upper temperature limits are set mainly on the basis of the material requirements including both the metal of which the combustion chamber is made as well as the refractory materials which may be used, including some of the latter materials which in some cases may have substantial catalytic properties from the viewpoint of combustion of the undesirable components. With regard to the metal of which the chamber is made it is desirable to employ high temperature alloys even though the chamber may be lined with ceramic or other types of linings or coatings. This not only assures resistance to high temperatures, but also to oxidation of the metal and minimizes warping of the chamber. A large number of such alloys which may contain chromium, cobalt, nickel and other additives (and are sold under trade names such as Chromalloy, Hastelloy, Inconel, and various stainless types) are available and their use is preferred.

The above generalized discussion will fully illustrate that I may in general employ conventional alternative means when desirable or convenient to those described above to accomplish the desired objectives.

As pointed out previously various types and forms of heat exchangers may be employed in connection with my invention. FIG. 5 illustrates a simple form of heat exchanger 130 which may be used alternatively to that illustrated in each of FIGURES 1, 3 and 4. The latter employs a multiplicity of tubes thru which the hot gases flow, whereas that illustrated in FIG. 5 is essentially made up of a single tube which of course is not only much less expensive but is also less complicated in construction; while not as efficient as the other illustrative form it is entirely satisfactory. (The use of fins around the tube would increase the efficiency of this heat exchanger if desired.) The purified hot exhaust gases from the combustion chamber pass thru the tube 131″ of the heat exchanger and the cooled exhaust passes thru (the muffler and/or resonator if required and) the tail pipe from 131″ to the atmosphere. Tube 131″ is surrounded and supported in the heat exchanger body or shell 132 with insulation 133 of the types already described, i.e., either compact or if loose contained in an outer shell of sheet metal 134. The cool air is introduced at 135 and cools the hot gases in the tube 131′ by indirect heat exchange and passes out at 135′ to be utilized in the process as heretofore described. The cool air is in turn heated.

FIG. 6 illustrates three forms of simple refractory grids made of the ceramic or other refractory materials heretofore referred to in connection with the use of refractories. These grids which are illustrated in various forms A, B and C may be removably or fixedly located as units or in a plurality in the combustion chamber in transverse relationship to the flow of gases and function as flame targets or surface combustion units alternatively to the other forms of grids heretofore referred to. They also serve to mix the burning gases as they flow thru the chamber. Normally substantially complete combustion is accomplished in the chamber. As previously pointed out combustion may also be assisted by the introduction of air at various points along the length of the chamber.

The general form of the combustion chamber has been described in connection with the operation thereof and FIGURES 7 and 9 show further details of practical alternative forms of combustion chambers which are not only practical but may be readily assembled and parts replaced as desired.

Referring to FIG. 7 the combustion zone or combustion tube made of alloy steel resistant to high temperatures (or alternatively of a ceramic material) 145 is fitted with removable inlet and outlet sleeve fittings 146 and 147 with inlet and outlet conduits 148 and 149 respectively attached thereto. These fittings may also be of high temperature resistant alloy steel like the combustion tube, and may if desired or found necessary be lightly sealed with a high temperature furnace cement. The combustion tube and fittings are housed in a metal shell 151 with a fixed end 156 and attached cuff 158 on the exit side of the combustion tube and a removable end 155 and cuff 157 on the entrance side. These cuffs fit over and support the inlet and outlet conduits of the combustion tube which together with the attached sleeves support the tube within the housing. The combustion tube is heat insulated with insulating materials of the type already described, either compacted around the tube or packed loosely within the housing. Elements 153 and 154 are likewise insulating members fitted at either end of and within the housing preferably made of transite (an asbestos cement composition) ceramic material or similar durable insulating members. The front end 155 of the combustion tube housing is removable for assembly and removal or replacement of parts of the combustion tube assembly as found necessary. This is held in place by a plurality of nuts 164 and bolts 163 passing thru corresponding holes in the end fitting and affixed to a flange 165 integral with the housing 151. The bolts are shown affixed to the flange 165 but may alternatively pass therethrough (not shown) with nuts on either side. Tube or conduit 161 with adapter portion 159 and similar tube fitting 162 with adapter 160 are fitted to the cuffs on the inlet and outlet sides of the housing ends respectively; and to the elements leading into and out of the combustion zone or tube as already described in connection with the figures. Spark plug 150 is connected in any suitable manner with the combustion tube.

FIG. 8 is a detail of end element 155, the numbers shown corresponding to those already described in connection therewith.

FIG. 9 corresponds in general to FIG. 7 except that in the latter the combustion tube and end fittings (i.e. the sleeves) are separable whereas in FIG. 9 the combustion zone or tube 145′ is an integral unit, the ends being swedged down on the inlet side to inlet conduit 148′ and on the outlet side to tube 149′. The outlet end of the housing 156′ is integral with the housing as in FIG. 7 is shown with attached cuff 158′ and outlet tube fitting 162′ with adapter end 160 fitting over the cuff 158′. Similarly to FIG. 7 the inlet end of the housing is removable for assembly and disassembly of the unit. The inlet tube fitting 161′ with adapter 159′ functions as already described for the corresponding elements in FIG. 7. The inlet housing end shown as 155′ with attached or integral cuff 157′ in FIG. 9 is however modified in respect of that in FIG. 9, particularly with the means of removal and reassembly. The housing at this end has an integral flange 166 with a plurality of fixed bolts 163′ and corresponding nuts 164′ is fitted over the end of the housing (shown as a cover) and is held in place by the nuts and bolts. The housing itself 151′ and the insulation 152′ etc., including the ends 154′ and 166, are otherwise like that shown in FIG. 7. The spark plug 150′ also corresponds to that shown in FIG. 7.

FIG. 10 is a detail of the inlet end described in connection with FIG. 9 and the corresponding parts have already been described in connection therewith.

It is noted that the combustion tube 145 assembly is interchangeable with the combustion tube 145′ so far as the housing and other members are concerned and that I may also employ other obvious means indicated by the description of the foregoing figure.

OPERATING CONDITIONS AND EXAMPLES

It is in one aspect the essence of my invention that the operation of the internal combustion engine and accompanying vehicle be carried out in an efficient and convenient manner to accommodate starting and stopping and varying rates of speed without specific regard to composition of the exhaust gas in doing so; but in all cases thereafter taking the necessary steps and utilizing the means of overcoming the objections to the exhaust gases.

The operating conditions within the combustion chamber to accomplish the above aims especially the preferred temperature range of about 1500° to 2000° F. (and more generally about 1400° to 2200° F.) have already been set forth. The aim with regard to existing pressures in the entrance of the combustion chamber and exit and in the system generally has already been described as very little departure from that existing in the conventional muffler system; for example at the entrance and exit of the muffler and tail pipe varying only from slightly above atmospheric pressure at the entrance to substantially about atmospheric pressure at the exit. The main objective of course is to disturb the operation of the engine as little as possible and to maintain it within practical limits with regard to existing pressures. I may however vary these pressures within operating limits.

*Air-fuel ratios.*—In order to obtain complete combustion in the combustion chamber it is desirable to maintain some excess of air over the theoretical required for combustion. This demands a variable air supply and air-exhaust ratio over a relatively wide range and this has been found difficult to do in the conventional low temperature (about 800° F. to about 1400° F.) catalytic processes for oxidation of the objectionable combustibles in the exhaust for several reasons: (a) The carbon monoxide, hydrogen and hydrocarbon contents of the exhaust gases are highest when the engine is idling and under heavy traffic conditions and a relatively high ratio of air to exhaust is required to oxidize the same; (b) the temperature rise of the exhaust gases and of the catalyst when the latter is used due to the catalytic oxidation reaction is rapid and high and may get out of control for satisfactory operation since the catalyst is sensitive to temperatures above about 1400° F. to 1500° F. and its effectiveness may even be destroyed or greatly deteriorated even below this range; (c) the situation is the reverse with respect to concentration of these components at cruising and at higher speeds and when the engine is operating most efficiently as the concentration of combustibles in the exhaust and the air requirement is at a minimum. Under these conditions a substantial excess of air could cool the catalyst below the minimum temperature at which it is effective and the sensible heat normally provided by the hot exhaust is insufficient due to the cooling effect to maintain the desired reaction. This is especially true of diesel engines where the initial temperature of the exhaust is much lower than with the spark ignition types. It is also noted that the catalysts used in connection with catalytic oxidation processes, and where leaded gasolines are used, are very sensitive to deposition of lead oxide and other lead compounds and are greatly depreciated thereby. This is not so in my process since the combustion of leaded gasoline in the engine and the resulting lead oxides in the exhaust do not adversely affect the efficiency of combustion in my process or of the refractories when used by me.

In my invention the temperature limitations imposed upon the catalyst are not present as the effective operating range is from about 1400° F. to 1500° F. in the low range and up to 2000° F. more or less in the upper range; and the surface combustion refractory material which in this sense functions as a semi-catalyst to facilitate combustion, or the combustion process generally, is not affected by these higher temperatures and this problem is eliminated. Moreover since additional fuel is added in the form of the blowby gases and is found necessary, supplementary carburetor fuel air mixture or the liquid fuel, e.g., direct from the gasoline or diesel fuel pump both of the type and from the source supplied to the engine or other suitable primary fuel may be provided to the combustion chamber as described, the conditions referred to above where the combustibles in the exhaust gases are at a minimum are absent in my method and process. In this connection the scavenger or pollutant fuels of the blowby or carburetor vent type which normally escape to the atmosphere are insufficient to meet the requirements for the varied conditions existing in the operation without the use of added fuel of a primary type referred to above. The fuel added is under control and is not affected by any changes in the combustible content of the exhaust gases. Therefore the air exhaust ratio may be correlated to supply sufficient air through the bypass line as described to maintain a sufficient excess for complete combustion with the maximum normal combustible components in the exhaust gases (from about 4.5% to 9% carbon monoxide, about 2% to 4% hydrogen and about 0.1 to 0.5 of hydrocarbon vapors, all by volume, although it must be recognized that at cruising speeds the concentration of these components may fall considerably below these figures). At the other end of the scale while it is preferable that the total concentration of combustibles be maintained above the minimum flammable limit, it is noted that my process has a considerable degree of flexibility in that the hydrocarbon combustible content of the exhaust gases may be increased by the addition of pollutant of the blowby type gases and/or additional primary carburetor fuel-air mixture or fuel from the tank or pump and particularly when the temperature falls below about 1450° F. to 1500° F. (or any predetermined temperature) provision is made for both air and fuel to be increased, or the air to be decreased and the fuel (or a fuel-air mixture) to be increased and in any event an external source of heat other than the combustibles normally present in the exhaust gases is provided. It is also noted in this connection that at the temperature prevailing during normal operation of my process (above about 1450° F.) and in the presence of the refractory of the types described in the combustion chamber, oxidation of the carbon monoxide and other combustibles noted will proceed substantially to completion as a result of the semi-catalytic effect and surface combustion or of combustion generally.

Generally it has been found by me that the addition of air in the range of about 30% to 80% (and upward) and preferably between 50% to 60% based on the volume of the exhaust gases and in general sufficient or somewhat in excess for the added combustibles will meet the requirements, and the arrangements and the system are provided to supply the air as required; also it is noted that, normally, added fuel is approximately of carburetor composition and carries its own air supply, although other primary fuel may be employed in addition to the pollutant fuels, which require additional air.

*Specific examples.*—(1) In one operation as an example employing an approximately air-fuel ratio of from 13:1 to 15:1 by weight under idling conditions the analysis of the exhaust gases from an automobile (with engine of the spark ignition type) without treatment may show about 6% carbon monoxide and about 3% hydrogen and about 0.2% hydrocarbons all by volume. Under cruising conditions these concentrations would be considerably diminished but the average under all driving conditions including stopping and starting in heavy traffic may amount to about 4% carbon monoxide, 2% hydrogen and about 0.1% hydrocarbons in addition to partially oxidized hydrocarbons and carbonaceous substances in both cases. The blowby gases in this type of operation showed roughly the same composition (but of course is very much less in volume) as the carburetor mixture of gasoline and air which contained about 6% to 8% of gasoline by weight and about 2% and upward by volume. Based on the volume of the blowby gases and the hydrocarbon content the addition of the latter to the exhaust increased the hydrocarbon content by about 0.1% or somewhat more by volume which in my process is normally introduced into the exhaust gases entering the combustion chamber. A similar amount may be collected from the vent of the carburetor which would otherwise have escaped to the atmosphere as a pollutant along with the blowby or crankcase gasoline. Both of these may be classed as secondary fuels and are insufficient to maintain steady combustion under all necessary conditions. Both of these operating under the described conditions of substantially atmospheric pressure and a normal temperature range of about 1450° F. to 2000° F. in the combustion chamber with occasional additions of primary gasoline-air mixtures of carburetor composition which would otherwise be supplied to the engine (when the temperature drops below about 1450° F. to 1500° F.) a reduction of the carbon monoxide content from an average of about 4% to about 0.2% and/or less (and in general less than about 0.5%) may be obtained depending upon operating conditions. The carbon monoxide and the carbonaceous materials and the other combustibles in the exhaust including hydrogen and hydrocarbons, including that originally in the exhaust as well as the added fuel combustibles in general of hydrocarbon character both the primary fuels of the type and from a source supplied to the engine; as well as the secondary pollutant types which in effect have been scavenged from the atmosphere referred to above may be substantially converted to water and carbon dioxide. All hydrocarbon types may be reduced to the requirements of about 275 p.p.m., in the outgoing exhaust.

(2) Similar results in general to those shown in Example 1 may be obtained (a) when the primary fuel is a liquid (instead of being carbureted) supplied from the gasoline pump and/or tank of the spark ignition engine. In this case the added primary fuel to the exhaust and air is atomized in the inspirator and vaporized in the mixing chamber; and (b) when the primary fuel is a liquid of the type (heavier than gasoline) employed in the diesel engine in which case it is atomized in the inspirator and mixing chamber, and partially vaporized in the latter and further vaporized and burned in the combustion chamber.

It is obvious that the highly heated gases leaving the combustion chamber 2 are a very substantial source of power which could be converted under pressure (as by being produced under pressure) to turbine power for auxiliary use in conjunction with the regular piston engine power or separately and this especially becomes significant when it is considered that very much more potential power leaves through the exhaust than is utilized; and moreover it is potentially very greatly increased in my process. It is also obvious that my process may be applied to many industrial processes and uses wherein objectionable gases and odors are produced which should be eliminated and I intend to utilize the same in this connection.

By the term refractory materials as used in the claims I means materials of the type described which are not damaged by heating to temperatures even above the maximum employed by me and for example of the types set forth and described by Etherington: Modern Furnace Technology (2nd ed., 1944, pp. 379–436); and Griswold: Fuels, Combustion and Furnaces, McGraw-Hill, 1946, pp. 333–357.

By the expression "added fuel of the type and from a source supplied to the said internal combustion engine" is meant a primary fuel added to the exhaust gases undergoing treatment, normally a gasoline in the case of spark ignition engine which may be directly from the carburetor or intake manifold of the latter or alternatively initially a liquid from the gasoline pump or tank; and in the case of diesel engines a liquid fuel generally heavier than gasoline. By the expression secondary or pollutant fuel added to the exhaust gases which normally is exhausted or leaked to the atmosphere as a pollutant from the crankcase or the carburetor vent to the atmosphere and are recovered and added to the exhaust gases undergoing treatment primarily to avoid a nuisance to the atmosphere. There are alternatively referred to by the names "crankcase gasoline" or "blowby" in the first instance and "carburetor vent" gasoline.

It is understood that there are many variations and departures within the scope of the principles I have disclosed in connection with my invention and I desire to be limited only by the broad spirit and scope of my invention and the claims relating thereto.

I claim:

1. In combination with an internal combustion engine having a conduit for conveying exhaust gases from the engine to an exhaust purifier, the improvement which comprises a combustion chamber through which the exhaust gases are passed, means to supply a forced flow of air and separate means consisting of an inspirator energized by said forced flow of air to supply a controlled flow of fuel to the said combustion chamber, a spark plug located within the combustion chamber to ignite the combustible materials entering the said chamber and means for discharging the purified exhaust gases into the atmosphere.

2. The combination defined in claim 1 wherein the inspirator energized by said forced flow of air controls the flow of fuel consisting of a secondary fuel.

3. The combination defined in claim 1 wherein the inspirator energized by said forced flow of air controls the flow of a fuel consisting of gasoline.

4. The combination defined in claim 1 wherein the inspirator energized by said forced flow of air controls the flow of a fuel heavier than gasoline.

5. The combination defined in claim 1 wherein the inspirator energized by said forced flow of air controls the flow of exhaust gases.

6. The combination defined in claim 1 wherein the inspirator energized by said forced flow of air controls the flow of exhaust gases and fuel.

7. The combination defined in claim 1 wherein the inspirator, energized by said forced flow of air controls the flow of fuel, consisting of a primary fuel.

8. The combination defined in claim 1 wherein the separate means consisting of an inspirator, energized by said forced flow of air supplies a controlled flow of fuel, consisting of a primary and a secondary fuel.

9. The combination defined in claim 1 wherein automatic valve means are employed to control the forced flow of air.

10. The combination defined in claim 1 wherein electrically activated valve means control the supply of the forced flow of air.

11. The combination defined in claim 1 wherein responsive temperature sensitive switch means are located in the outlet of the combustion chamber to electrically activate the spark plug and the said electrically activated valve means.

References Cited by the Examiner
UNITED STATES PATENTS
3,248,872  5/1966  Morrell _____ 60—30

MARK NEWMAN, *Primary Examiner.*

RALPH D. BLAKESKEE, *Examiner.*